United States Patent [19]
Nair et al.

[11] Patent Number: 6,068,428
[45] Date of Patent: May 30, 2000

[54] CAPSULE TRAIN SEPARATION SYSTEM FOR FLUID CAPSULE PIPELINE TRANSPORATION

[75] Inventors: Satish S. Nair; Hongliu Du, both of Columbia, Mo.

[73] Assignee: The Curators of the University of Missouri, Columbia, Mo.

[21] Appl. No.: 08/965,958

[22] Filed: Nov. 7, 1997

Related U.S. Application Data

[60] Provisional application No. 60/053,008, Nov. 12, 1996.

[51] Int. Cl.$^7$ .................................................. B41J 2/00
[52] U.S. Cl. ..................... 406/109; 406/192; 406/183; 406/117; 406/28; 406/29; 406/50; 406/83; 406/84; 406/85; 406/93; 406/12; 406/13; 406/14
[58] Field of Search ............................ 406/192, 28, 29, 406/109, 117, 50, 83, 84, 85, 93, 183, 12, 13, 14; 209/520

[56] References Cited

U.S. PATENT DOCUMENTS

| | | | |
|---|---|---|---|
| 460,081 | 9/1891 | Collins | 406/5 |
| 2,799,540 | 7/1957 | Makinson | 406/94 |
| 2,811,393 | 10/1957 | Little | 406/117 |
| 3,101,182 | 8/1963 | Todt et al. | 406/83 |
| 4,946,317 | 8/1990 | Liu et al. | 406/46 |

FOREIGN PATENT DOCUMENTS

| | | | |
|---|---|---|---|
| 83830 | 5/1921 | Germany | 406/28 |
| 1005129 | 6/1964 | United Kingdom | 406/84 |

OTHER PUBLICATIONS

Liu, H., "Hydraulic Capsule Pipeline", *Journal of Pipelines*, vol. 1, No. 1, pp.11–23 (Jan. 1981).

Nair, S.S. et al., "Theoretical and Experimental Considerations for Coal Log Pipeline Control Systems–Preliminary Study", *18th International Technical Conference on Coal Utilization and Fuel Systems*, Clearwater, Florida, pp. 747–758 (Nov. 1993).

Woodson, R. J. et al. "Analysis of Pressure Surges in a Pump Bypass System for Hydraulic Capsule Trnasport", *Freight Pipelines, 6th International Symposium on Freight Pipelines*, Hemisphere Publishing Corp., New York, pp. 359–363 (May 1990).

*Primary Examiner*—Christopher P. Ellis
*Assistant Examiner*—Richard Ridley
*Attorney, Agent, or Firm*—Senniger, Powers, Leavitt & Roedel

[57] ABSTRACT

Apparatus for spacing consecutive capsules of solid material traveling as a capsule train in a pipeline in which the capsules are carried by a fluid flowing through the pipeline includes a separation system interposed between upstream and downstream portions of the pipeline for receiving the train of capsules. The separation system passes consecutively separated capsules within the capsule train to the downstream portion. The separation system is constructed for increasing the spacing between consecutive capsules within the capsule train in the downstream portion of the pipeline after passing through the separation system. The volume of fluid flowing from an outlet location of the separation system is substantially the same as the volume of fluid flowing into an inlet location of the separation system. A method for boosting fluid pressure in the capsule carrying pipeline consecutively spaces capsules within a capsule train as the train approaches a dual lock booster station to permit the booster station to alternately divert the trains into the first and second locks of the booster station.

25 Claims, 5 Drawing Sheets

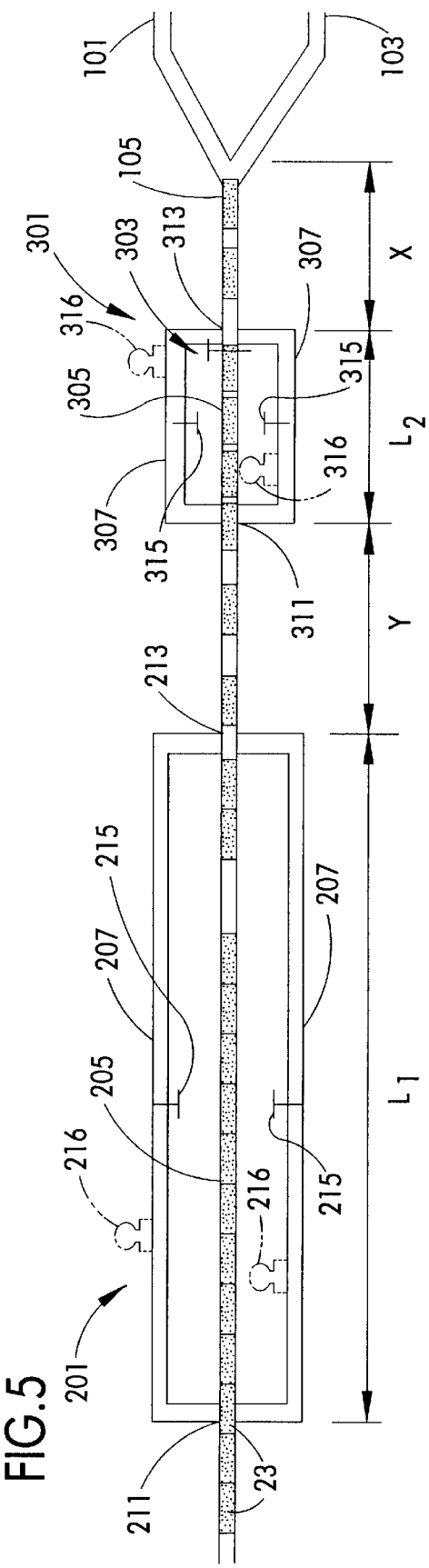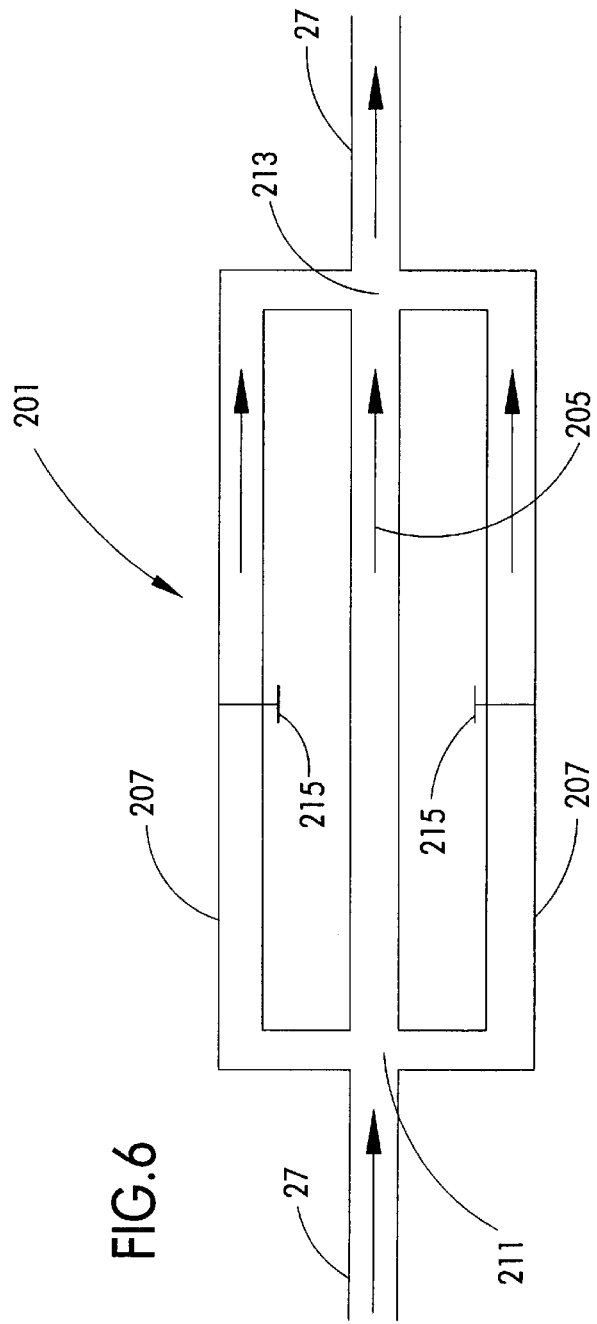
FIG. 5
FIG. 6

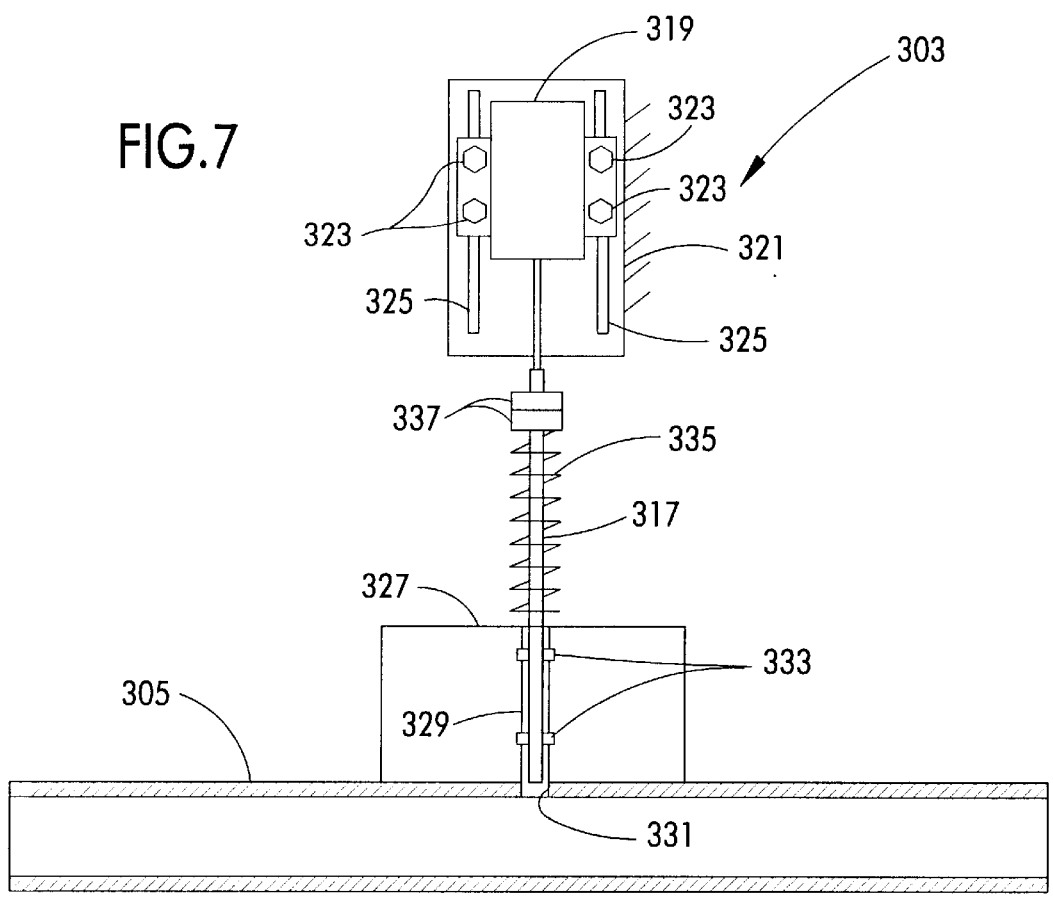
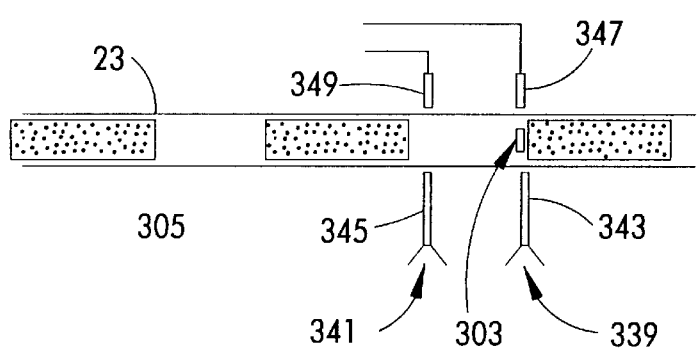
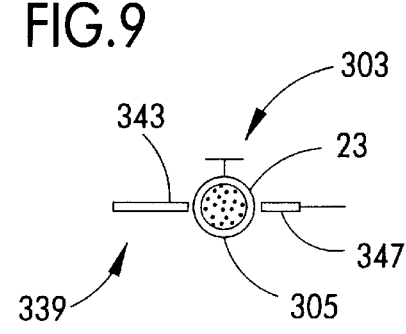

CAPSULE TRAIN SEPARATION SYSTEM FOR FLUID CAPSULE PIPELINE TRANSPORATION

This application claim benefit of Provisional Application 60/053,008 filed Nov. 12, 1996.

The U.S. Government has rights in this invention pursuant to Contract No. EEC-9108841 awarded by the National Science Foundation.

BACKGROUND OF THE INVENTION

This invention relates generally to a fluid capsule pipeline system for transporting capsules over long distances, and more particularly to a capsule train separator for spacing consecutive capsules of solid material travelling in a pipeline at intermediate locations along the pipeline.

Fluid capsule pipelines represent an emerging technology by which freight is transported in the form of a capsule (such as a cylindrical shaped container or compacted, solid mass) carried by a fluid, usually water, moving through a pipeline. Such a mode of transportation has several potential advantages over conventional truck and rail modes, some of which are that it is less energy-intensive, less harmful to the environment, less labor-intensive and more economical in many circumstances. Fluid capsule pipeline system concepts are novel as compared to existing commercial gas or other fluid pipeline systems. The transport of solid objects presents mechanical design and control automation issues which are distinct from those associated with fluid transport (or from the transport of particulate solids which can be suspended in a fluid).

A fluid capsule pipeline system of the type to which the present invention presently relates is disclosed in U.S. Pat. No. 4,946,317. The pipeline system includes a manufacturing system where the capsules are formed or filled, an injection system to inject capsules into a pipeline, and an ejection system at the end of the pipeline for removing the capsules from the pipeline. Pressurized fluid such as water or gas is used to move the injected capsules through the pipeline.

After long stretches of transport, inevitable head losses in the system cause the velocity of the capsules to decrease. Should the velocity fall too far, the capsules would no longer be carried fully by the fluid and would engage the walls of the pipe forming the pipeline. Accordingly, booster stations are preferably provided to increase the head of the fluid thereby to maintain an adequate velocity for the capsules. However, in order to boost the fluid pressure, the solid capsules must be separated from at least a substantial portion of the fluid.

It is envisioned that capsules could be injected into the pipeline in trains (i.e., collections of capsules having a relatively close spacing) separated by a distance to permit the trains to be handled independently at the booster stations. However, it has been found that several trains may combine, with capsules touching each other or with random intercapsule spacing and typically a continuous stream of capsules may approach the booster station. The small and greatly randomized spacing of the capsules makes it difficult for separation of the capsules from the fluid to occur at the booster stations.

Among the several objects and features of the present invention may be noted the provision of apparatus for separating capsules travelling in a pipeline which will reliably provide spacing between consecutive capsules; the provision of such apparatus which is mechanically simple and capable of separating the capsules without the use of valves or other mechanical components; the provision of such apparatus which inhibits the jamming of the capsules in the pipeline; the provision of such apparatus which provides sufficient spacing between consecutive trains of capsules to permit a diverter valve of a booster station to switch positions; the provision of such apparatus which minimizes head loss and transients associated with separating the trains of capsules; the provision of such apparatus which reduces the impact forces experienced by the capsules and pipeline; the provision of such apparatus which more efficiently controls operation of the booster station; the provision of such a capsule pipeline which includes safety features for immediately shutting down the pipeline in emergency situations.

Still further among the several objects and features of the present invention may be noted the provision of a method for boosting the pressure in a pipeline which can be carried out rapidly without substantial interruption in the travel of capsules through the pipeline; the provision of such a method which permits simple timed control; and the provision of such a method which operates the booster station efficiently while reducing the risk of emergency shutdown of the pipeline.

In general, apparatus of the present invention for spacing consecutive capsules of solid material travelling in a pipeline, the capsules being carried by a fluid flowing through the pipeline, comprises a separation system interposed between upstream and downstream portions of the pipeline for receiving capsules from the upstream portion and passing separated capsules to the downstream portion. The separation system is constructed for increasing the spacing between consecutive capsules in the downstream portion of the pipeline after passing through the separator.

Additionally, a method of the present invention for boosting fluid pressure in a pipeline system in which capsules of solid material are injected into a pipeline containing a flowing fluid to carry the capsules over long distances comprises positioning a valve to divert a first number of capsules defining a first train into a first lock of a boosting station. Fluid ahead of the capsules in the first train is then removed from the first lock. The valve is positioned to divert a second number of capsules defining a second train to a second lock at the boosting station and fluid ahead of the capsules in the second train is then removed from the second lock. The fluid removed from the second lock is pressurized and injected from the second lock into the first lock to increase the pressure of the fluid to carry the first train of capsules in the first lock into the pipeline at increased velocity. Capsules travelling through the fluid flow are separated to provide a spacing between the first and second trains prior to reaching the boosting station to permit the position of the valve to be switched between diverting capsules into the first lock and diverting capsules into the second lock.

Other objects and features will become in part apparent and in part pointed out hereinafter.

BRIEF DESCRIPTION OF THE DRAWINGS

FIG. 3 is a top view of a booster station of the pipeline system of FIG. 1;

FIG. 5 is a schematic top view of a train separation system of the pipeline system of FIG. 1;

FIG. 6 is a top view of a capsule separator of the train separation system of FIG. 5;

FIG. 7 is a side view of a stopping mechanism of the train separation system of FIG. 5;

FIG. 8 is a top view of sensors and the stopping mechanism of the train separation system of FIG. 5; and FIG. 9 is a schematic end view of the sensors and stopping mechanism of FIG. 8.

Corresponding parts are designated by corresponding numerals throughout the several views of the drawings.

DESCRIPTION OF THE PREFERRED EMBODIMENT

Figure 1:
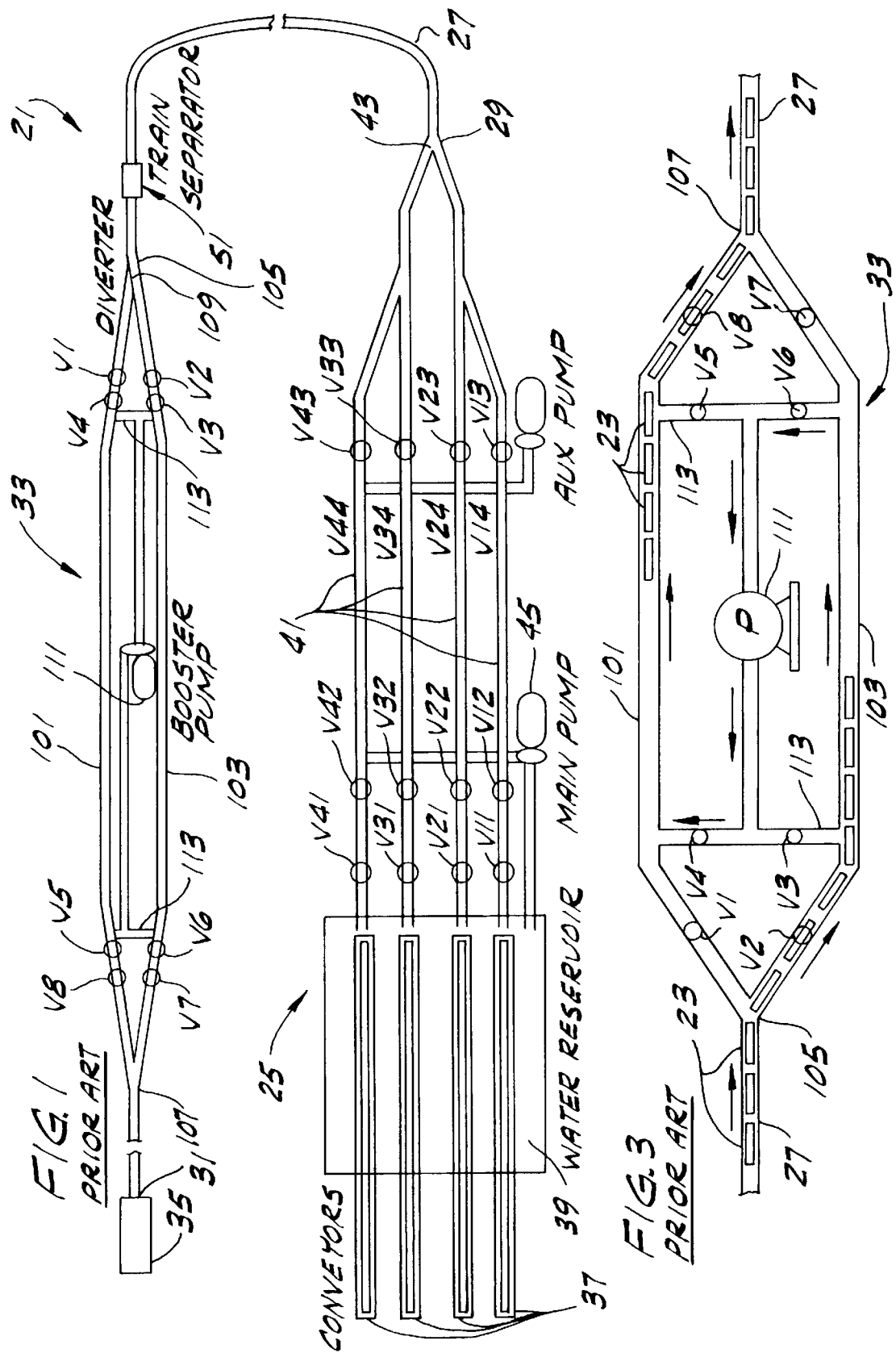
FIG. 1 is a schematic top view of the fluid capsule pipeline system of the present invention.
Figure 2:
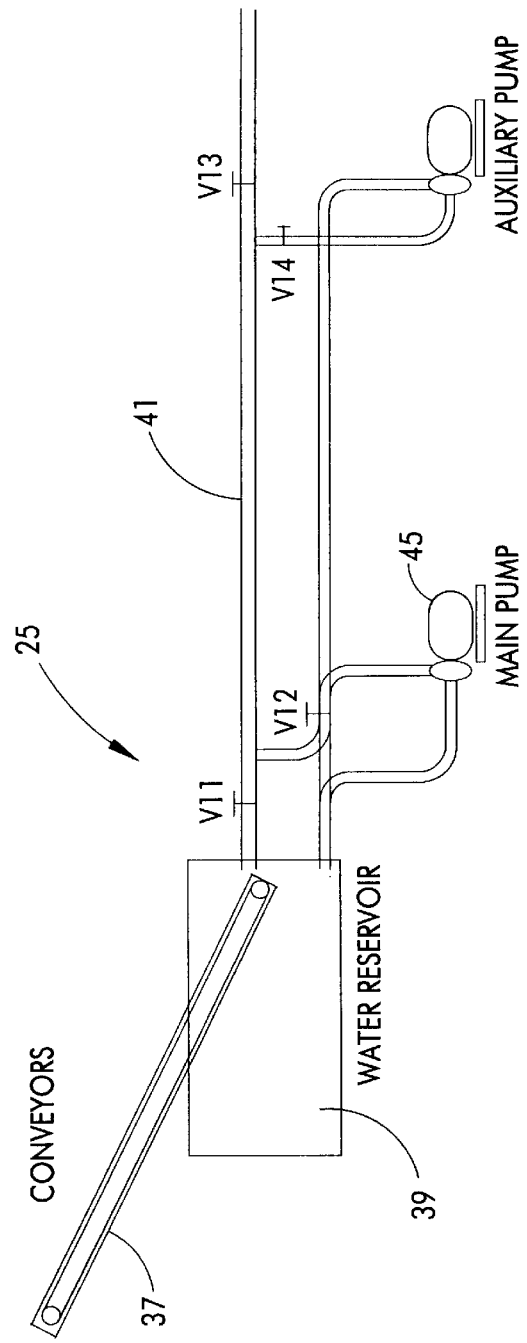
FIG. 2 is a side view of an injector of the pipeline system of FIG. 1.

Referring first to FIG. 1, a fluid capsule pipeline system of the present invention for use in transporting capsules 23 (FIG. 2), such as a coal log formed by compacted coal, over long distances is indicated in its entirety by the reference numeral 21. It is to be understood that "capsule", as used herein is intended to include not only the compacted, solid coal logs, but also hollow containers made of solid material (not shown) filled with material to be transported. The capsule pipeline 21 comprises an injector, indicated generally as 25, for injecting multiple capsules 23 into a main pipe 27 one at a time and one after another, the main pipe having an inlet 29 for receiving capsules from the injector and an outlet 31, a booster station, indicated generally as 33, for maintaining a desired capsule and fluid flow velocity through the main pipe, and an ejector 35 at the outlet of the main pipe for ejecting capsules from the pipeline. A fluid pipeline system of the same general type as the preferred embodiment described herein is disclosed in U.S. Pat. No. 4,946,317, which is incorporated herein by reference.

The main pipe 27 may be constructed of any material commonly used in pipeline assembly, such as polyvinyl chloride, concrete, steel or other suitable material. The pipe 27 and capsules 23 are sized such that the diameter of the pipe is slightly larger than the diameter of the capsules transported through the pipe. For example, the ratio of capsule diameter to pipe diameter is preferably about 80–95%. Lab tests using a pipeline diameter of approximately 1.25 inches and a capsule having a 1.00 inch diameter and 4.8 inch length have been successfully completed. However, it is contemplated that commercial pipelines for transporting capsules may be substantially larger in diameter, such as approximately eight inches or greater. It is to be understood that the diameters of the pipe and capsule may be other than described herein without departing from the scope of the present invention.

As shown in FIG. 1, the injector 25 includes conveyors 37 which carry the capsules 23 down into a reservoir 39 of water (or other suitable fluid, whether liquid or gaseous) where the capsules are received in single file within each of a series of locks, or launcher tubes 41, which are aligned parallel to each other and converge at one end 43 into the inlet 29 of the main pipe 27. The launcher tubes 41 are filled with capsules 23 and water from the reservoir 39. A main pump 45 pressurizes water from the reservoir 39 and pumps the water into the launcher tubes 41 to cause water to flow from the inlet 29 of the main pipe 27 toward the outlet 31. The collection of capsules 23 within a particular launcher tube 41 which are carried by the water into the main pipe 27 and referred to herein as a "train". The capsule train is transported through the main pipe by the flow of the pressurized water within the pipe. After a pre-determined amount of time has elapsed, another capsule train from a different launching tube 41 may be injected into the main pipe 27. While water is described herein as the preferred fluid for transporting the capsules, it is understood that other fluids, whether liquid or gas, may be used without departing from the scope of this invention.

When transporting the capsule trains over long distances, the fluid pressure in the main pipe 27 tends to dissipate, reducing the capacity of the water to transport the capsules through the main pipe. One or more booster stations 33, such as that shown in FIG. 3, are included in the pipeline 21 approximately every 50 miles to compensate for the pressure loss and keep the capsule trains moving through the pipe at a desired velocity. Each booster station 33 comprises a pair of locks 101, 103 capable of communicating with the main pipe 27. The locks 101, 103 are connected to the main pipe 27 at an inlet 105 of the booster station 33 and angle outward away from the main pipe in a Y-joint configuration. The locks 101, 103 further extend parallel to each other before converging back into the main pipe 27 at an outlet 107 of the booster station 33. A pivotally mounted diverter 109 is located at the intersection of the main pipe 27 and the locks 101, 103 at the booster station inlet 105 to selectively divert the water and capsules 23 into the respective locks.

Valves V1, V2, V3, V4, V5, V6, V7, V8 in the locks 101, 103 are selectively opened and closed by a suitable controller 53 (FIG. 10) for directing the flow of water and capsules 23 into and out of the locks. For example, inlet valves V1 and V2 control the flow of water into the respective locks 101, 103, while outlet valves V7 and V8 control the flow of water and capsules out of the locks at the outlet 107 of the booster station 33. A booster pump 111 communicates with the locks 101, 103 via connecting pipes 113 for boosting the fluid pressure of the water as it withdraws water from one lock and pumps it into the opposing lock. Valves V5 and V6 selectively control the flow of water out of the locks 101, 103 and into the booster pump 111, while valves V3 and V4 selectively direct the water flowing from the pump into the locks. The locks 101, 103, pump 111 and valves V1, V2, V3, V4, V5, V6, V7, V8 are arranged in such a manner that water flows out of the locks and into the pump while the capsules remain in the locks.

Figure 4:
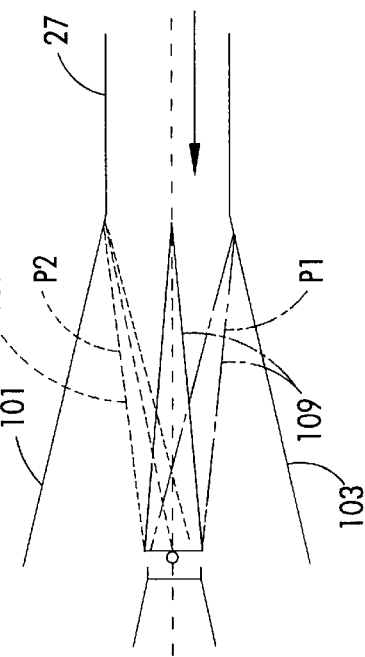
FIG. 4 is a top view of a diverter of the booster station of FIG. 3.

The diverter 109, as shown in FIG. 4, is preferably triangular or tapered in cross section to ensure proper guidance of the capsules 23 into the locks 101, 103. The diverter 109 is constructed of a suitable material, such as metal or nylon, having sufficient flexibility to bend somewhat without being damaged when impacted by capsules. The diverter 109 is pivotally mounted and driven by a suitable actuator (not shown) for swinging between a first position P1 (shown in phantom) in which capsules 23 are guided into the first lock 101, and a second position P2 (shown in phantom) in which capsules are guided into the second lock 103. The diverter is shown in solid in a neutral position in FIG. 4.

Operation of the dual lock booster station 33 is as shown in FIG. 3. The flow arrows indicate the direction of flow of water through the booster station 33 at a particular instant of operation. The diverter 109 is positioned by the actuator to divert a train of capsules 23 into the second of the two locks 103. The even numbered valves V2, V4, V6 and V8 are open while the odd numbered valves V1, V3, V5 and V7 are closed. A train of capsules 23 is passing into the second lock 103 along with the reduced pressure water flowing through inlet valve V2. Since exit valve V7 is closed and valve V6 is open, the booster pump 111 draws water out of the second lock 103 through valve V6 and into the pump where the fluid pressure of the water is increased. The boosted pressure water is then pumped through open valve V4 into the first lock 101, which is shown as having been previously loaded with a train of capsules 23. In this way, the water is separated from the capsules 23 for pressurization.

With valve V5 closed and exit valve V8 opened, the pressurized water injected into the first lock 101 carries the capsules 23 out of the first lock 101 and back into the main pipe 27 at the outlet 107 of the booster station 33 with a greater velocity than when the capsules entered the booster station. The diverter 109 is then repositioned to divert a new train of capsules into the first lock 101 while the fluid pressure of the water in the second lock 103 is boosted in a manner similar to that described above for boosting the fluid pressure in the first lock 101. Thus, the dual lock booster station 33 increases the fluid pressure of the water in one lock for re-injecting capsules 23 into the main pipe 27 at a desired velocity while loading the second lock with incoming capsules and water having a reduced velocity, thereby minimizing the interruption of capsule flow through the pipeline 21 caused by the need to separate the liquid from the capsules to boost its pressure.

When two or more capsule trains combine or come together before reaching the booster station, the capsules 23 touch each other or have random inter-capsule spacing and form a continuous stream of capsules as they approach the booster station 33. Once a lock is filled, the diverter 109 must switch positions. However, because there may be very little spacing between the capsules 23, a capsule may become jammed by the diverter 109 or the diverter may not be able to switch positions, resulting in the need to shutdown the pipeline.

To this end, the capsule pipeline of the present invention includes a train separation system, indicated generally in FIG. 1 as 51. As shown in FIG. 5, the train separation system 51 comprises a pair of substations, referred to as a capsule separator, indicated generally as 201, and a capsule stopper, indicated generally as 301, located upstream of the diverter 109 to reduce the risk of a shutdown. The purpose of the separator 201 is to generate sufficient spacing between the capsules 23 or capsule trains so that the capsule stopper 301 can insert a stopping mechanism, indicated generally as 303, into the pipe to temporarily stop the transport of capsules into the booster station 33 while the diverter 109 switches positions.

As best seen in FIGS. 5 and 6, the separator 201 is defined by a portion 205 of the main pipe 27 and a pair of separator bypass passages or lines 207. The bypass lines 207 branch laterally outward from the main pipe 27 at an inlet 211 of the capsule separator 201 and converge back into the main pipe a distance L1 downstream of the inlet to define an outlet 213 of the separator. The entrance to each bypass line 207 is covered with a plate having openings therein. The openings allow water to flow into the bypass lines 207 while the plate directs capsules through the main pipe 27 without becoming jammed at the entrance to the bypass lines. The bypass lines 207 extend parallel to the main pipe portion 205 of the separator 201 between the inlet 211 and outlet 213 to form multiple parallel flow lines for directing fluid through the separator. The bypass lines 207 are preferably of the same diameter as the main pipe 27 but may be of a different diameter to increase or decrease the volume of flow diverted through the bypass lines.

While the capsule separator is preferably free of any mechanical components such as valves or pumps to reduce the risk of mechanical failure, an adjustable valve 215 within each of the bypass lines 207 may be used to adjust the volume of water diverted through the bypass lines depending on the desired spacing of the capsules 23 and the estimated reduction of fluid pressure in the main pipe 27 at the separator inlet 211. A pump 216 (shown in phantom in FIG. 5) may also be used in the bypass lines to boost the flow of water converging back into the main pipe for increasing the separation between capsules. However, the valves 215 and pump are not required for operation of the separator 201 and may be omitted without departing from the scope of this invention.

In operation, water flowing through the main pipe 27 is diverted through the bypass lines 207 as it flows into the separator inlet 211, thereby reducing the velocity of the water flowing through the main pipe portion 205 of the separator 201. For example, as indicated by arrows in FIG. 6, using two bypass lines 207 without obstructions (e.g. without valves) results in approximately one-third of the water volume in the main pipe 27 flowing into each of the bypass lines, while the remaining one-third of the water volume continues flowing through the main pipe portion 205 of the separator 201. The loss of water velocity in the main pipe portion 205 causes capsules flowing into the separator 201 to decelerate toward the separator outlet 213, reaching the outlet at a reduced velocity. As shown in FIG. 5, the deceleration causes the capsules 23 to bunch together within the separator.

As water from the bypass lines 207 flows back into the main pipe 27 at the outlet 213 of the separator 201, the water volume and velocity increases to approximately that of the water entering the separator inlet 211. This increased velocity causes the capsules 23 to accelerate as they pass through the separator outlet 213. As each capsule 23 accelerates through the outlet 213, the respective capsule immediately behind the accelerating capsule remains at the reduced velocity until it reaches the outlet, producing a separation between respective capsules. For example, in lab tests using a pipe diameter of 1.25 inches and a capsule having a 1.00 inch diameter and 4.8 length, we successfully demonstrated a separation of capsules a distance of 2.25 to 2.50 inches upon exiting the separator after entering the separator with little or no spacing.

Figure 10:
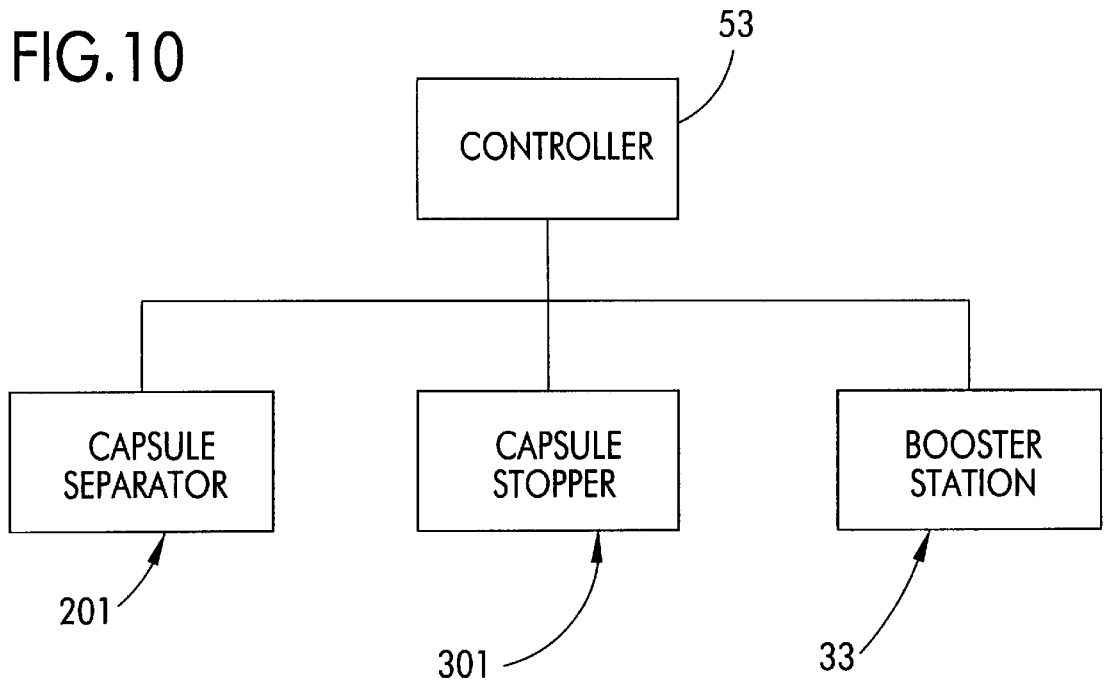
FIG. 10 is a schematic of a controller for controlling the booster station and train separation system.

The valves 215 inserted into the bypass lines 207 may be used to control separation of respective capsule trains, eliminating the need to individually separate each capsule 23. For example, operation of the valves 215 may be controlled by the booster station controller 53 (FIG. 10). In this manner, as a continuous stream of trains is passing through the separator 201, the valves 215 are closed so that no water is diverted through the bypass lines 207 and the capsules 23 flow through the separator without separation. As the end of a train approaches the separator 201, the valves 215 are opened to divert water through the bypass lines 207 and separate the train from a trailing capsule train.

Calculation and determination of the spacing between capsules 23 is based on a number of factors as set forth in "Automation and Control Design Issues for Hydraulic Capsule Pipelines", as printed in "Fluid Power Systems and Technology", 1995 ASME International Mechanical Engineering Congress and Exposition, pg. 153–159, which is incorporated herein and attached hereto as Appendix A. Additional calculations as well as presentation of our lab tests are discussed in unpublished "Design of Capsule Train Separator and Emergency Stopper", Satish S. Nair and Hongliu Du, Version 1, August, 1994, which is incorporated herein and attached hereto as Appendix B.

The separated capsules 23 flowing from separator 201 flow through the main pipe 27 into the capsule stopper 301. The stopper 301 has an inlet 311 a distance Y downstream of the separator outlet 213, and an outlet 313 a distance X upstream of the diverter 109 of the booster station 33. With reference to FIGS. 5 and 7, the stopping mechanism 303 is located immediately upstream of the stopper outlet 313 and comprises a rod 317 driven by a suitable actuator, such as a push-type solenoid 319, between a retracted position in which the rod is withdrawn from the pipe to allow capsule flow through the stopper outlet 313, and an extended position in which the rod extends into the pipe to stop capsule flow through the outlet without inhibiting the flow of water to the booster station 33. The rod 317 is sufficiently rigid to prevent permanent damage to the rod as it is impacted by the capsules 23, but is also slightly flexible so as to not damage the capsules impacting the rod. The rod 317 is sufficiently small in diameter to allow unimpeded flow of water to the booster station 33 while the capsules 23 are stopped, thereby preventing potentially catastrophic transients and head loss in the main pipe 27.

The solenoid 319 is mounted on a bracket 321 adjacent the main pipe 27 by two pairs of bolts 323 inserted through a pair of slots 325 in the bracket. The rod 317 extends from the solenoid 319 toward the main pipe 27 and is guided into the main pipe through a supporting block 327 having a guide opening 329 communicating with an opening 331 in the main pipe through which the rod enters the pipe. The supporting block 327 also counteracts the bending forces exerted on the rod 317 by capsules 23 impacting the rod when it is in its extended position. A pair of O-rings 333 within the supporting block 327 prevents leakage of water from the main pipe 27 into the solenoid 319.

A compression spring 335 surrounds the rod 317 between the supporting block 327 and a pair of nuts 337 threaded onto the rod adjacent the solenoid 319. Adjusting the position of the nuts 337 will vary the residual force applied by the compression spring 335, and once the desired force is obtained, the nuts are secured in position by tightening the two nuts against each other. Actuation of the rod 317 by the solenoid 319 is controlled by a suitable controller, such as the booster station controller 53 (FIG. 10), such that the solenoid receives a signal to actuate the rod when the position of the diverter 109 is to be switched. It is understood that actuation of the rod may be by hydraulic, pneumatic or other mechanical type actuators and remain within the scope of the invention.

A pair of sensors, indicated generally as 339, 341, adjacent the main pipe 27 determine whether a capsule 23 is blocking the opening 331 through which the rod 317 enters the pipe and whether there is adequate separation between the capsules to extend the rod into the main pipe before a capsule approaches the opening. The sensors 339, 341 each comprise a laser generator 343, 345 which directs a laser beam transversely through the main pipe 27, and a diode 347, 349 on the opposing side of the pipe for receiving the beam and transmitting a signal to the controller 53. Operation of the laser beam sensors 343, 345 is well known to those skilled in the art and will not be described herein. Because the laser beam must pass through the main pipe 27, the pipe must be constructed of a transparent material, such as plexiglass, at the location of the sensors 339, 341. However, it is to be understood that other types of sensors may be used to detect the presence of a capsule, such as sensors not requiring the pipe to be transparent, without departing from the scope of the present invention.

One sensor 339 is positioned at the same location as the stopping mechanism 303 for sensing whether a capsule is passing over the opening 331 through which the rod 317 enters the pipe 27. The other sensor 341 is located upstream of the first sensor 339 and is spaced apart from the first sensor a distance corresponding to the time required for extending the rod 317 into the main pipe 27 after the controller 53 signals the solenoid 319 to actuate the rod and the velocity of the capsules. Unless both sensors 339, 341 simultaneously show that there is no capsule 23 present, the rod 317 will not be permitted to extend into the pipe 27.

As seen in FIG. 5, the capsule stopper includes a portion 305 of the main pipe 27 and a pair of stopper bypass passages or lines 307 similar to the capsule separator 201. The bypass lines 307 branch laterally outward from the main pipe 27 at the stopper inlet 311 and converge back into the main pipe a distance L2 downstream at the stopper outlet 313. The entrance to each bypass line 307, such as where the bypass line branches away from the main pipe 27, is covered with a plate having openings therein. The openings allow water to flow into the bypass lines 307 while the plate directs capsules through the main pipe 27 without becoming jammed at the entrance to the bypass lines. The bypass lines 307 extend parallel to the main pipe portion 305 of the stopper 301 between the inlet 311 and outlet 313 to form multiple parallel flow lines for directing fluid through the stopper 301. The bypass lines 307 are preferably of the same diameter as the main pipe 27 but may have different diameters to increase or decrease the volume of flow diverted through the bypass lines.

While the capsule stopper is preferably free of any mechanical components other than the solenoid, an adjustable valve 315 within each of the bypass lines 307 may be used to adjust the volume of water diverted through the bypass lines. A pump 316 (shown in phantom) may also be used in the bypass lines 307 to boost the flow of water converging back into the main pipe 27 for increasing the rate at which capsules flow from the stopper to the booster station. However, the valves 315 and pump are not required for operation of the stopper 301, and may be omitted without departing from the scope of this invention.

Operation of the stopper 301 in conjunction with the booster station 33 is now described. As one of the booster station locks 101, 103 fills with capsules 23, the controller 53 allows a pre-determined time period to elapse, such as 3–5 minutes. The controller 53 then signals the solenoid 319 to actuate the rod 317 into its extended position within the pipe 27 to stop the flow of capsules while the diverter 109 switches positions. If a capsule 23 is passing by either of the sensors 339, 341 of the capsule stopper 301, the sensors send a signal to the controller 53 to delay actuation of the solenoid 319. When the sensors 339, 341 simultaneously detect no presence of a capsule, the solenoid 319 actuates the rod 317 to its extended position within the pipe 27 to stop the flow of capsules. Separation of the capsules 23 in the separator 201 prior to entering the stopper 301 ensures a proper spacing between the capsules for the sensors 339, 341 to allow the solenoid 319 to actuate the rod 317 into the pipe 27. The time at which the rod 317 is actuated to its extended position is referred to herein as time $T_0$, the times described herein being predetermined and fixed for a particular pipeline system.

With the rod 317 in its extended position, capsules 23 flowing through the capsule stopper 301 are prevented from passing through the stopper outlet 313. A portion of the water flowing into the stopper inlet 311 is diverted through the bypass lines 307. For example, without obstructions (e.g. valves) in the bypass lines 307, approximately one-third of the water entering the stopper 301 is diverted into each of the bypass lines while the remaining water continues to flow through the main pipe portion 305 of the stopper. As with the separator 201, the velocity of the water flowing through the main pipe portion 305 of the stopper 301 decreases as water is diverted through the bypass lines 307, thus reducing the velocity of the capsules flowing through the stopper. While the spacing between the capsules 23 or capsule trains may be slightly reduced because of the decreased velocity, the length L2 of the stopper 301 is sufficiently small such that a desired spacing is still present as the capsules reach the outlet 313 of the stopper.

Where the valves 315 are used with the bypass lines 307, the valves are preferably fully opened at this time to allow maximum flow through the bypass lines. In this manner, the velocity of the capsules 23 flowing through the stopper 301 is reduced, lessening the impact forces imparted by the capsules on the stopping mechanism 303 or upon each other and thereby reducing the risk of damage to the stopping mechanism and capsules.

At time instant $T_1=T_0+X/V_c+\Delta T_s$ (sec), the position of the diverter 109 is switched as described above with regard to operation of the booster station 33. X is the distance between the outlet 313 of the stopper 301 and the diverter, $V_c$ is the capsule velocity upon leaving the stopper, and $\Delta T_s$ is an additional safety time delay for ensuring that all of the capsules downstream of the stopper outlet have cleared the diverter.

At time $T_2=T_1+T_d+\Delta T_s$ (sec), (e.g., approximately 3–5 seconds after stopping the flow of the capsules), the rod 317 is retracted from the main pipe 27 to allow capsules to pass through the stopper outlet 313 toward the diverter 109. $T_d$ is the time taken to switch the diverter 109 from one position to the other, (e.g., 1–2 seconds). The valves 315 in the bypass lines 307 of the stopper 301 are closed to increase the flow of water through the main pipe portion 305 of the stopper, thereby increasing the rate at which the capsules flow out of the stopper. The cycle is then repeated as capsules 23 are alternately diverted into the booster station locks 101, 103.

Should an emergency situation arise at the booster station 33, such as a the jamming of capsules 23, the controller 53 sends a signal to the solenoid 319 to actuate the rod 317 to its extended position to stop the flow of capsules into the booster station.

It will be observed from the foregoing that the capsule pipeline 21 and method operation of the present invention represent an improvement over prior pipelines and methods. The capsule separator 201 and stopper 301 efficiently separate and stop the flow of the capsules 23 or capsule trains using a minimal number of mechanical components, thereby reducing the risk of a pipeline shutdown due to mechanical failure and increasing reliability. The capsule stopper 301 also allows unimpeded flow of water to the booster station while capsules are stopped within the stopper, thereby providing sufficient time for the diverter 109 to switch positions without introducing catastrophic transients or head losses into the system. Providing bypass lines 307 in the capsule stopper 301 decreases the velocity of capsules 23 within the stopper such that when the flow of capsules is stopped, the capsules impact the stopping mechanism 303, or one another, with less impact force, reducing the possibility of damage to the stopping mechanism and capsules. Moreover, the stopping mechanism 303 provides a safety feature for stopping the flow of capsules 23 to the booster station 33 should an emergency situation arise.

Additionally, because the separator 201 and stopper 301 efficiently control the flow of capsules or capsule trains into the booster station 33, operation of the booster station may be controlled by a time based controller 53 rather than sensors, further reducing the risk of mechanical failure and decreasing the complexity and cost of operating the booster station.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for spacing consecutive capsules of solid material traveling as a capsule train in a pipeline, the capsule train comprising a plurality of said capsules in longitudinal, generally closely spaced relationship, the capsules being carried by a fluid flowing through the pipeline, the apparatus comprising a separation system interposed between upstream and downstream portions of the pipeline for receiving the train of capsules from the upstream portion and passing consecutively separated capsules within the capsule train to the downstream portion, the separation system being constructed for increasing the spacing between consecutive capsules within the capsule train in the downstream portion of the pipeline after passing through the separation system, the volume of fluid flowing from an outlet location of the separation system being substantially the same as the volume of fluid flowing into an inlet location of the separation system.

2. Apparatus as set forth in claim 1 wherein the separation system comprises a separator constructed for spacing apart consecutive capsules of the capsule train received in the separator, the separator being free of structure in the pipeline for blocking the travel of the capsules by engagement with the capsules.

3. Apparatus as set forth in claim 2 wherein the separator comprises a capsule passage for receiving the capsules of the capsule train and a portion of the fluid carrying the capsules through the separator, and a bypass passage for receiving another portion of the fluid carrying the capsules but not the capsules generally at an upstream end of the separator, the separation of fluid carrying the capsules into the capsule passage and the bypass passage causing a reduction in velocity of the capsules in the separator, the bypass passage converging with the capsule passage at a downstream end of the separator thereby to accelerate consecutive capsules from the capsule passage into the pipeline downstream of the separator and provide a spacing between the capsules.

4. Apparatus as set forth in claim 3 wherein the bypass passage constitutes a first bypass passage and wherein the separator further comprises a second bypass passage in parallel fluid flow arrangement with the capsule passage and first bypass passage in the separator, the second bypass passage converging with the capsule passage and first bypass passage at the downstream end of the separator.

5. Apparatus as set forth in claim 4 wherein the separator further comprises a valve in each of the first and second bypass passages selectively positionable in each of the respective passages to control the amount of fluid passed through the first and second bypass passages.

6. Apparatus as set forth in claim 4 wherein the separation system further comprises a capsule stopper located downstream of the separator, the capsule stopper including a stop mechanism capable of selective positioning in the pipeline into the space between adjacent capsules provided by the separator for engaging a capsule in the pipeline to stop the travel of the capsule in the pipeline, the stop mechanism being constructed to permit flow of fluid in the pipeline past the stop mechanism.

7. Apparatus as set forth in claim 6 wherein the stop mechanism comprises a rod and actuator for actuating movement of the rod, the rod being selectively extendible and retractable by the actuator into and outward from the pipeline.

8. Apparatus as set forth in claim 6 wherein the capsule stopper further comprises a capsule passage for receiving the capsules and a portion of the fluid carrying the capsules through the capsule stopper, and a bypass passage for receiving another portion of the fluid carrying the capsules but not the capsules at an upstream end of the capsule stopper, the separation of fluid carrying the capsules into the capsule passage and the bypass passage causing a reduction in velocity of the capsules in the capsule stopper, the bypass passage converging with the capsule passage at a downstream end of the capsule stopper, the stop mechanism being disposed for selective positioning in the capsule passage adjacent to the downstream end whereby the capsules are slowed down prior to engagement with the stop mechanism.

9. Apparatus as set forth in claim 8 wherein the capsule stopper further comprises a valve in the bypass passage, the valve being selectively operable to open the bypass passage of the capsule stopper to flow of fluid therethrough for decelerating the capsules, and to close the bypass passage to flow of fluid therethrough so that capsules are not decelerated in the capsule stopper.

10. Apparatus as set forth in claim 9 wherein the bypass passage of the capsule stopper constitutes a first bypass passage, and wherein the capsule stopper further comprises a second bypass passage in parallel fluid flow arrangement with the capsule passage and first bypass passage in the capsule stopper, the second bypass passage converging with the capsule passage and first bypass passage at the downstream end of the capsule stopper, the second bypass passage having a valve therein operable to open and close the second bypass passage to passage of the fluid therethrough.

11. Apparatus as set forth in claim 10 wherein the separator further comprises a valve in each of the first and second bypass passages of the separator, the valves being capable of selective positioning to control the amount of fluid passed through the first and second bypass passages of the separator.

12. Apparatus as set forth in claim 11 wherein the separator and capsule stopper further comprise pumps located in the respective first and second bypass lines.

13. Apparatus as set forth in claim 10 in combination with a booster station located downstream of the separator and capsule stopper for boosting the pressure of the fluid carrying the capsules, the booster station comprising a pump for pressurizing fluid received in the booster station, a first lock for receiving a first train of capsules and a second lock for receiving a second train of capsules, the booster station being configured for selectively delivering pressurized fluid from the pump to the first lock and second lock, the booster station further comprising a diverter selectively positionable for directing capsules travelling in the pipeline to the first lock and the second lock, the capsule stopper being adapted to stop the capsules sufficiently long to permit the diverter to switch between directing capsules to one of the first and second locks to directing capsules to the other of the first and second locks.

14. Apparatus as set forth in claim 13 further in combination with a controller for controlling the operation of the stop mechanism and the diverter of the booster station, the controller being preprogrammed to initiate the movement of the diverter from a position for diverting capsules into one of the first and second locks to a position for diverting capsules into the other of the first and second locks at a fixed time interval after initiating the stop mechanism to stop the capsules.

15. Apparatus as set forth in claim 14 wherein the controller is preprogrammed to initiate the stop mechanism to release the capsules to travel into the booster station at a fixed time interval following initiation of the diverter to switch positions.

16. Apparatus as set forth in claim 15 wherein the controller is preprogrammed to carry out initiation of the stop mechanism, switching the position of the diverter and releasing the capsules in sequential order and to repeat the sequence multiple times, the time interval between the initiation of each sequence being fixed.

17. Apparatus as set forth in claim 16 wherein the capsule stopper further comprises means for detecting the presence of capsules within a predetermined range of the stop mechanism, said detecting means being operable to override the fixed interval between initiation of consecutive sequences to prevent initiation of the stop mechanism when capsules are detected within the range.

18. Apparatus as set forth in claim 1 wherein the separation system comprises a capsule stopper including a stop mechanism being capable of selective positioning in the pipeline into the space between adjacent capsules provided by the separator for engaging a capsule in the pipeline to stop the travel of the capsule in the pipeline, the stop mechanism being constructed to permit flow of fluid in the pipeline past the stop mechanism.

19. A method for boosting fluid pressure in a pipeline system in which capsules of solid material are injected into a pipeline containing a flowing fluid to carry the capsules over long distances, the method comprising the steps of:

positioning a valve to divert a first number of capsules defining a first train into a first lock of a boosting station;

removing fluid ahead of the capsules in the first train from the first lock;

positioning the valve to divert a second number of capsules defining a second train to a second lock at the boosting station;

removing fluid ahead of the capsules in the second train from the second lock;

pressurizing fluid removed from the second lock;

injecting pressurized fluid from the second lock into the first lock to increase the pressure of the fluid to carry the first train of capsules in the first lock into the pipeline at increased velocity;

separating the capsules travelling through the fluid flow to provide a spacing between the first and second trains prior to reaching the boosting station to permit the position of the valve to be switched between diverting capsules into the first lock and diverting capsules into the second lock;

the step of separating the capsules comprising the steps of removing a substantial portion of the fluid surrounding the capsules in the pipeline at an inlet location of a capsule separator so that the capsules are decelerated, injecting the removed fluid back into the pipeline around the capsules at an outlet location of the capsule separator downstream from the inlet location where fluid was removed thereby to accelerate capsules passing through said downstream location for spacing apart consecutive capsules.

20. A method as set forth in claim 19 further comprising the steps of pressurizing the fluid removed from the first lock and injecting the pressurized fluid from the first lock into the second lock.

21. A method as set forth in claim 19 wherein the step of separating the capsules comprises the steps of stopping the capsules upstream from the booster station by positioning a stop mechanism in the path of the capsules and thereafter releasing the capsules.

22. A method as set forth in claim 21 wherein the steps of stopping the capsules, operating the valve to switch between positions and releasing the capsules to travel into the booster station define a sequence of steps which are initiated at fixed time intervals from each other.

23. A method as set forth in claim 21 wherein said sequence of steps is repeated multiple times, there being a fixed time interval between the initiation of each sequence.

24. A method as set forth in claim 19 wherein the step of separating the capsules further comprises the step of stopping the capsules in a capsule stopper downstream of the capsule separator by positioning a stop mechanism in the path of the capsules and thereafter releasing the capsules.

25. A method as set forth in claim 24 wherein the step of stopping the capsules further comprises the step of decelerating the capsule in the capsule stopper prior to reaching the stop mechanism.

* * * * *